July 23, 1940.    R. S. GUNDERSON    2,209,161
ARTIFICIAL FISH LURE
Filed Oct. 25, 1937
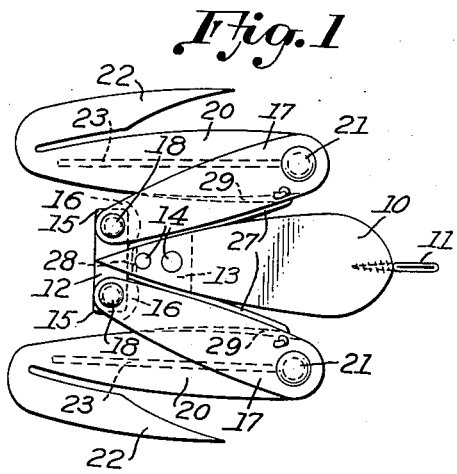
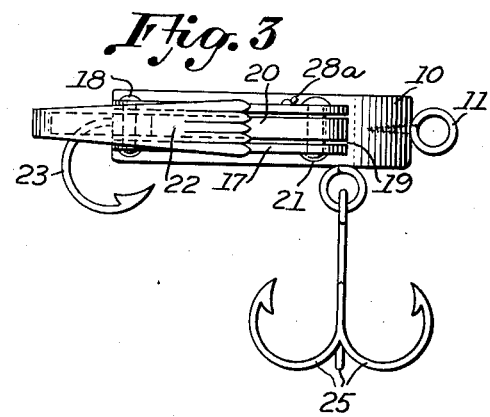
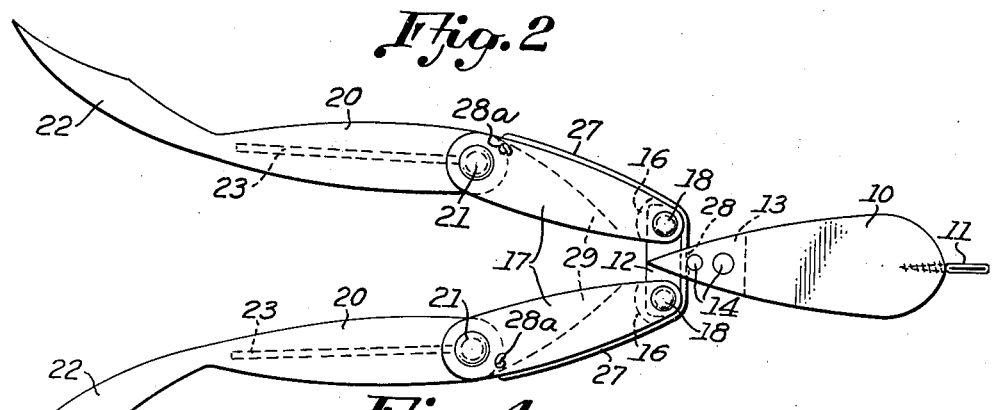
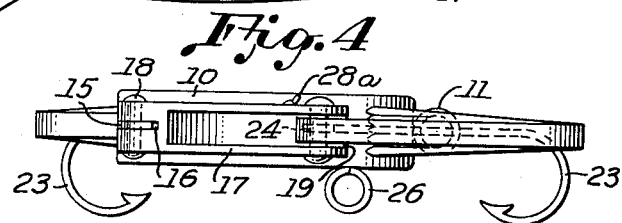
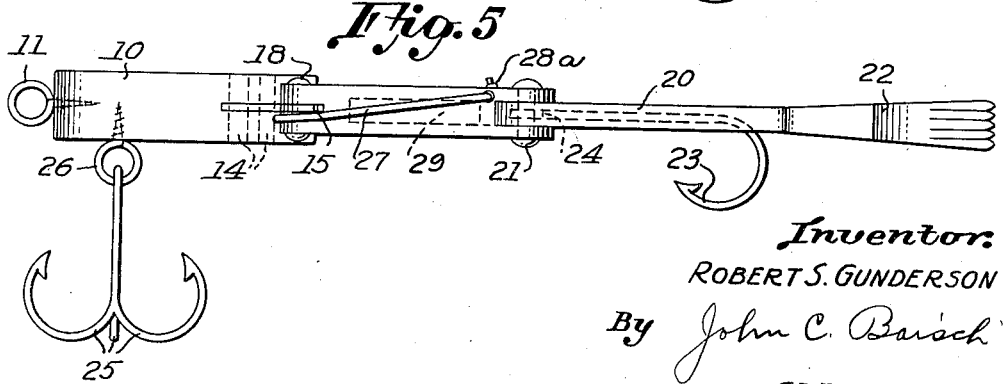
Inventor:
ROBERT S. GUNDERSON
By John C. Baisch
Attorney.

Patented July 23, 1940

2,209,161

UNITED STATES PATENT OFFICE 2,209,161

ARTIFICIAL FISH LURE

Robert S. Gunderson, Omaha, Nebr.

Application October 25, 1937, Serial No. 170,791

2 Claims. (Cl. 43—42)

The invention has to do with the art of artificial fish lures and has for its object an artificial fish lure in the likeness of a frog which simulates the swimming actions of a frog when cast into the water and drawn therethrough by intermittent pulls on the fish line to which said lure is attached.

Another object of the invention is to provide a device of the character above stated that is comparatively simple in construction and operation and that is relatively inexpensive to manufacture.

Other objects of the invention will appear in the following detailed description taken in connection with the accompanying drawing, wherein:

Figure 1 shows a plan view of my invention in its folded or resting position and without hooks depending from the body.

Figure 2 is a plan view of the same in its extended position.

Figure 3 is a side view of the device in its folded position with hooks depending from the body.

Figure 4 is a side view of the device, without the body hooks, the leg on the near side being in a forwardly position.

Figure 5 is a side view of the device in its extended position with depending body hooks.

Referring more particularly to the drawing reference numeral 10 indicates the body of the artificial frog, said body being of wood or other suitable material, preferably a material that tends to float in water. At the head or forward end of the body is screwed an eye screw 11 whereby the lure may be secured to a fish line for use. At the rear of the body is a T-shaped piece of metal 12, the forwardly extending portion 13 of which is received in a horizontal slot in the body provided therefor and secured in said slot by means of rivets 14. At the rear of the portion 13 are laterally extending portions 15, each of said portions 15 being adapted to be received in a slot 16 in one end of respective thighs 17, said thighs being pivotally connected to the respective portions 13 by pins 18. The free swinging ends of the thighs are provided with wide slots 19 in which are operatively received the forward ends of respective legs 20, said legs being pivotally joined to the free swinging ends of the thighs by rivets 21. The legs are of an elastic material such as rubber and at the outer or free swinging end of each leg is a foot 22 of like material. Each foot, in its normal resting position, extends forwardly adjacent the outer side of its respective leg as is clearly shown in Figure 1. Each leg is provided with a hook 23, the shank of which is imbedded in the leg with the eye 24 of said hook pivotally received on respective rivet 21. Depending hooks 25 are suitably secured to the under side of the body 10 by an eye screw 26 screwed into said body.

To retain the thighs 17 in their normal forwardly folded position against the sides of the body, as shown in Figures 1 and 3, an elastic band 27 of rubber or the like is provided. The band 27 is received in a laterally extending opening 28 adjacent the rear end of the body, said opening being forwardly of the pivotal axes of the rivets 18. The outer ends of the band 27 are secured to the respective thighs adjacent the forward ends and at the inner sides thereof. The ends of said bands are received through openings in the thighs provided therefor and knots 28a in the respective ends secure said ends and prevent same from slipping from said openings in the thighs. The band is under tension and normally draws the thighs yieldingly forward in the position shown in Figures 1 and 3. Normally the legs extend rearwardly and rest in grooves or channels 29 provided therefor in the thighs.

The lure is adapted to be drawn through the water on a fish line and by intermittently pulling on the line and then pausing simulation of the swimming action of a frog is secured. The pulling of the line causes the frog to be extended as shown in Figures 2 and 3, the resistance of the water against the feet retarding the forward movement thereof thereby extending same rearwardly and at the same time pulling the legs and thighs rearwardly and increasing the tension of the band 27. Upon cessation of the pull on the line the frog resumes its normal folded position, the elasticity of the band 27 pulling the thighs forwardly and the elasticity of the legs and feet causing said feet to resume their normal forwardly position. There is sufficient drag on the feet and legs to cause the legs to normally extend rearwardly in the water.

From the above description it will be clearly understood that I have provided an artificial fish lure in the likeness of a frog which simulates exactly the natural swimming actions of a live frog wherein the thighs, legs and feet are alternately extended and drawn or folded up by alternately pulling on the line and then ceasing to pull same. The thighs, legs and feet are extended upon forward movement of the lure and are folded as the forward motion diminishes or ceases. The resistance of the water against the thighs also aids in forcing the thighs, legs and feet rearwardly during the forward movement of the lure.

Having thus described my invention what I claim is:

1. An artificial fish lure, comprising a body, thighs pivotally secured to the body adjacent the rear end thereof, legs pivoted to the free swinging ends of the respective thighs, said legs being elastic and provided with elastic feet normally folded forwardly in a position adjacent the respective legs, and yielding means adapted to normally draw the thighs forwardly toward the body.

2. An artificial fish lure, comprising a body, thighs pivotally secured to the body adjacent the rear end thereof, legs pivoted to the free swinging ends of the respective thighs, each of said legs being provided with a foot normally folded forwardly in a position adjacent the leg and adapted to be extended rearwardly of the leg, each leg being provided with a fish hook, and yielding means adapted to normally draw the thighs forwardly toward the body.

ROBERT S. GUNDERSON.